(12) United States Patent
Denton et al.

(10) Patent No.: US 6,584,370 B2
(45) Date of Patent: Jun. 24, 2003

(54) METHOD OF CALCULATING LOW LEVEL CODES FOR CONSIDERING CAPACITIES

(75) Inventors: Brian T. Denton, Essex Junction, VT (US); Sanjay R. Hegde, Essec Junction, VT (US); Robert A. Orzell, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 09/891,554

(22) Filed: Jun. 26, 2001

(65) Prior Publication Data

US 2002/0198619 A1 Dec. 26, 2002

(51) Int. Cl.$^7$ .............................................. G06F 15/24
(52) U.S. Cl. ............................ 700/107; 700/99; 705/29
(58) Field of Search ................ 700/97–107; 705/28–29

(56) References Cited

U.S. PATENT DOCUMENTS

| | | | |
|---|---|---|---|
| 5,197,001 A | * | 3/1993 | Mukherjee .................... 705/29 |
| 5,235,508 A | | 8/1993 | Lirov et al. |
| 5,548,518 A | | 8/1996 | Dietrich et al. |
| 5,594,639 A | * | 1/1997 | Atsumi ........................ 700/107 |
| 5,630,070 A | | 5/1997 | Dietrich et al. |
| 5,787,000 A | | 7/1998 | Lilly et al. |
| 5,796,614 A | * | 8/1998 | Yamada ...................... 700/106 |
| 5,943,484 A | * | 8/1999 | Milne et al. ................. 700/100 |
| 5,971,585 A | | 10/1999 | Dangat et al. |
| 6,031,984 A | | 2/2000 | Walser |
| 6,041,267 A | | 3/2000 | Dangat et al. |
| 6,049,742 A | | 4/2000 | Milne et al. |

OTHER PUBLICATIONS

Orlicky, J., "Material Requirements Planning", 1993, McGraw Hill.
Hopp, W. J., and Spearman, M.L., "Factory Physics: Foundations of Manufacturing Management", 1996, Irwin, Chicago, 135–141.
Leachman, R.C., Benson, R.F., Liu, C., and Raar, D.F., 1996, "IMPRESS: An Automated Production–Planning and Delivery–Quotation System at Harris Corporation–Semiconductor Sector", Interfaces, 26, 1, 62–64.
Sullivan, G., and Fordyce, K., 1990, "IBM Burlington's Logistics Management System", Interfaces, 20, 1, 43–64.

* cited by examiner

Primary Examiner—Leo Picard
Assistant Examiner—Douglas S. Lee
(74) Attorney, Agent, or Firm—McGuireWoods LLP; Richard Kolulak

(57) ABSTRACT

A method and system for controlling sequential capacity allocation through modification of traditional low level codes (LLC). The method and system of the present invention employs a systematic set of decision rules for interactively adjusting LLCs so that they are consistent with interdependencies of resources among parts due to resource sharing.

17 Claims, 13 Drawing Sheets

LLC 1 2 3

X—Y—Z

A—B—C—D

LLC 1 2 3 4

FIG. 3

B AND E SHARE THE SAME CAPACITY
B AND F SHARE THE SAME CAPACITY
D AND F SHARE THE SAME CAPACITY

METHOD OF CALCULATING LOW LEVEL CODES FOR CONSIDERING CAPACITIES

CROSS REFERENCE TO RELATED APPLICATION

This application is related in subject matter to U.S. patent application Ser. No. 09/891,850 filed by Sanjay R Hegde, Robert John Milne, Robert A. Orzell, Shivakumar P. Patil and Mahesh Chandra Pati for "Method For Allocating Limited Component Supply And Capacity to Optimize Production Scheduling" which is incorporated herein by reference.

BACKGROUND OF THE INVENTION

1. Field of the Invention

The present invention generally relates to computer implementable decision support systems for determining a production schedule of feasible material releases within a complex multi-stage manufacturing system architecture. In more particularity, the present invention relates to a system for rationing manufacturing resources among competing demands according to a defined set of business rules.

2. Background Description

The manufacturing of semiconductors is a complex and refined process. This process includes everything from growing silicon crystals, to the actual placement and soldering of chips to a printed circuit board. Initially, raw wafers are cut from a silicon ingot and processed through a specific sequence of work centers. The end goal of this process is to build a set of integrated circuits on the surface of the silicon wafer according to a specific circuit design. This process involves repeatedly applying four basic steps: deposition, photolithography, etching, and ion implantation. These steps are the means by which materials with specific dielectric properties (e.g., conductors, insulators) are deposited on the surface of the wafer according to the precise circuit design specifications. These steps are repeated many times to build up several layers (typically between 12 and 25 layers) of the circuits.

After the circuits have been built on the wafers they are tested to determine the resultant yield of operational circuits and tagged for later reference. The circuits are then diced and sorted, and subsequently wire bonded to a substrate to assemble a module. These modules, which are further tested to determine electromagnetic and thermal characteristics, are eventually combined on printed circuit boards to form cards. Finally, the cards are tested and those that pass are eventually used in the assembly of a wide range of finished electronic products (e.g., personal computers, printers, CD players, etc.). From the point of view of semiconductor manufacturing, the modules and cards are, mostly, the finished products taken to market.

To assemble the modules and cards (or other end products), a Bill of Material (BOM) is needed to specify the required components used in the assembly of each particular part number (PN) produced within the manufacturing system. The BOM can be used to generate a graphical representation of the stages within a manufacturing process for each of the finished products. For example, FIG. 1 shows a high level block diagram of the BOM for semiconductor manufacturing which can be broken into the following four aggregate stages: wafer stage 110, device/substrate stage 120, module stage 130, and card stage 140. These aggregate stages may involve many steps each of which may significantly impact the flow of materials through the manufacturing system. For example, the wafer stage 110 may involve wafer fabrication involving many passes through photolithography work centers to build multiple levels of a circuit structure. The dicing of the silicon wafer stage 120 involves a single item in the production process which is then converted into different devices. Also, the card stage 140 may involve the assembly of many devices to generate a single card. These stages result in multiple qualities of items being output from various stages of the manufacturing system according to a known distribution.

Resource requirements at various stages in the manufacturing system play an important role in the development of a feasible production schedule in most industries. These resources are typically machines for carrying out the above mentioned processes in semiconductor manufacturing and may include items such as furnaces, cutting tools for dicing chips, and testing machines for determining the operational characteristics of devices. Typically, insufficient resources are available to accommodate perfect just-in-time processing at the various manufacturing stages for all orders. Thus, the finite availability of resources must be accounted for in computing a schedule, and in some cases processing must be carried out earlier or later than desired depending on such availability. A property of resource requirements which is typical in semiconductor manufacturing, but not common to most industries, is the fact that a component processed within the manufacturing system may have to revisit the same resource many times. This is referred to as reentrant flow scheduling.

In addition to the BOM, other sources of manufacturing information such as yields, cycle times, shipping routes, etc. are critical for advance planning and scheduling of the product. However, a fundamental problem faced in all manufacturing industries is the matching of demand and assets over a set time period. By way of example, production lead times necessitate the advance planning of production so that material releases throughout the production system are coordinated with the end customers demand for any of a wide range of finished products (typically on the order of thousands in semiconductor manufacturing). Such advance planning depends on the availability of finite resources which include, for example, finished goods inventory, work in process (WIP) at various stages of the manufacturing system and work center capacity. Furthermore, there may be multiple locations, processes, and work centers that may be utilized for a particular job.

As is known, product advance planning decisions are necessary due to the complicated process architecture and unavoidably long lead times to complete processing through all manufacturing stages for a finished product. For this reason and to accommodate the planning and scheduling functions within the semiconductor manufacturing industry, a tiered planning system was devised. The following is a summary based on the tier system devised by Sullivan, G. and Fordyce, K., 1990, "IBM Burlington's Logistics Management System", Interfaces, 20, 1, 43–64. In this tiered system each tier is defined by the time frame to which the decisions pertains.

Tier 1: Long range (3 months to 7 yr) strategic level decisions such as mergers, capacity acquisition, major process changes, new product development, and long term policy based decisions.

Tier 2: Medium range (1 week to 6 months) tactical scheduling involving yield and cycle time estimation, forecasting and demand management, material release planning and maintenance scheduling.

Tier 3: Short to medium range (weekly planning) operational scheduling for optimizing consumption and allocation of resources and output of product, demand prioritization techniques, capacity reservation and inventory replenishment.

Tier 4: Short range (daily) dispatch scheduling for addressing issues such as machine setups, lot expiration, prioritizing of late lots, job sequencing, absorbing unplanned maintenance requirements and assigning personnel to machines.

The above taxonomy of planning and scheduling decisions is a hierarchical one, i.e., decisions in higher tiers affect lower tiers. For example, long range capacity acquisition decisions determine eventual yield and cycle times, the available resources that can be utilized, and the extent to which maintenance is to be scheduled in the future. As is known, decisions in higher tiers, by the nature of their long time frames, are made under considerable uncertainty and thus seek to anticipate future requirements based on current information. On the other hand, lower level tier decisions are of a corrective/reactive nature and act to absorb uncertainty not accounted for in the higher tiers. It is also noted that advanced production planning and scheduling decision support systems are typically run on a weekly basis; however, the planning horizon for such runs may range several years depending on the planning horizon of interest and the level of detail in forecasting. Thus, advance planning systems may impact decisions in tiers 1, 2 and 3 which, in turn, may affect tier 4 decisions. Therefore, the matching of assets to demand is a major planning activity which affects decisions within all tiers.

It is noted that if unlimited assets were available then the matching of demand with assets would be straightforward. In reality, however, finite supply and capacity create constraints on production scheduling. These constraints make the determination of a feasible production schedule (let alone an optimal one) a complex problem. The production schedule, which includes major activities involved in the production planning process, can be divided into three categories: Supply Aggregation (SA), Materials Requirements Panning (MRP) and Resource Allocation (RA).

Supply Aggregation (SA)

The Supply Aggregation involves capturing and transforming micro/factory floor details into a manageable data set. For example, WIP at a particular work center in the manufacturing system may ultimately travel through a variety of different routings. These routings depend on which type of finished product is eventually produced by the WIP. However, at any given point in the system a set of operations can be isolated which are common to all potential routings that the WIP can travel through from that point forward. In other words, a limited set of the immediate future operations required for the WIP are known.

The purpose of the Supply Aggregation step is then to project the WIP forward through the required work centers to points at which decisions regarding alternative routings are necessary. As the WIP is moved forward, its amount is adjusted for yield losses at the work centers through which it has traveled. Furthermore, the time at which the WIP becomes available at the projected work center is computed based on known cycle times at each work center. In reality, these times occur over a continuum; however, in practice, these times are discretized into a finite set of time periods. The end result of the Supply Aggregation is then to significantly reduce the number of material release points considered in future calculations which, in turn, decreases computation time to compute a feasible production schedule.

Material Requirements Planning (MRP)

Material Requirements Planning (MRP) is a well known production scheduling method based on "explosion" of finished product demand using manufacturing information such as the BOM, yield and cycle times, inventory and planned receipts. The MRP is based on taking demand for finished product and sequentially moving backwards through the BOM (exploding). Required material releases are determined as well as the ideal release date based on cycle times at each work center at each level of the BOM.

Specialized process dependent factors in semiconductor manufacturing introduce additional complexities beyond those that can be readily handled by basic MRP. These additional complexities may result from material substitution or binning, both of which must be accounted for in computing production schedules. For example, at certain stages of the manufacturing process there is the opportunity for material substitution in which higher quality items are substituted for lower quality items (e.g., 900 MHz processor substituted in place of a 700 MHz processor). Another important process specific to semiconductor manufacturing is binning which refers to a distribution of quality levels for circuits built on a silicon wafer. The effect of binning is to link decisions about material releases among multiple PNs within the BOM which subsequently requires the use of large scale optimization methods, typically linear programming (LP) based models. The production scheduling system which incorporates LP in generating material releases to account for binning and material substitutions is referred to as Advanced Material Requirements Planning (AMRP). See, U.S. Pat. No. 5,943,484, which is incorporated herein by reference in the entirety.

Resource Allocation (RA)

MRP generates a set of ideal material releases under the assumption that unlimited resources are available. The purpose of Resource Allocation is then to systematically adjust this ideal set of releases to make them feasible with respect to constraints due to limited resources. That is, RA is concerned with the allocation of limited capacity to generate a feasible production schedule.

Historically a broader group of methodologies, referred to as extended MRP or MRP II, have included steps in which capacity requirements are evaluated based on releases generated by MRP. A method called "Best Can Do" (BCD) (see, U.S. Pat. No. 5,971,585), which uses linear programming, extends the capability of MRP II based systems from analysis to the actual development of a near optimal production schedule. This involves moving up from lower to higher levels of the BOM (implosion) and allocating resources sequentially at each level based on a priority ranking of the MRP material releases (which are, in turn, determined by priority ranking of orders they support). The resources allocated, using these systems, can be separated into two groups, supply and capacity. The fundamental difference between these two types of assets is that unapplied supply is available to apply at a later period; whereas, unapplied capacity is not available to apply at a later period. When supply and/or capacity constraints are violated by the MRP releases, the schedule of releases is adjusted in time by moving a portion of the release to an earlier period if possible and otherwise a sufficiently later period in time such that the required supply and capacity are available.

Plans generated using MRP are often referred to as ideal plans since they are uncapacitated (they assume unlimited supply and capacity). With this said, various rough-cut capacity planning methods have been documented in the literature (("Factory Physics: Foundations of Manufacturing Management", Hopp, W. J., Spearman M. L., 1996, Irwin, Chicago). The nature of these methods is to determine when capacity constraints are violated rather than how to generate a feasible schedule. Detailed capacitated material release scheduling has been less explored.

Most modern production planning heuristics calculate low level codes (LLC). These are codes which are computed and assigned to each of the PNs in the BOM so that MRP and RA heuristics know which sequence to process the PNs. For instance, the PROFIT™ BCD heuristic first conducts an "explosion" (MRP) moving downwards through the BOM supply chains and then conducts an "implosion" (RA) moving upwards through the BOM supply chains. During this implosion, the resulting production plan is forced to be feasible subject to constraints on available component supply and capacity resources by adjusting the MRP scheduled releases, in time, by moving them earlier, if possible, or later in time, if necessary. For both the explosion and implosion, production plans are determined level by level, according to the sequence defined by the assignment of LLCs, where the entire time horizon is planned for the complete set of components at a given LLC. Thus, the computation of LLCs is a critical preprocessing step to the complete production scheduling system.

The concept of allocating capacity sequentially according to an imposed ranking requires special attention within a complex multi-stage manufacturing system. In a typical model, dependency among PNs within the BOM is tracked by using LLCs. By way of example and again referring to the example of FIG. 1, wafers are used to produce devices/substrates which are then used to produce modules and, in turn, cards. In this example, the LLC assignment to the different levels would be: level 1 for cards, level 2 for modules, level 3 for devices/substrates and level 4 for wafers. In more complicated cases, in which there are many PNs and complicated interdependency, the assignment of LLCs is less trivial. The following algorithm, similar to others presented previously in the literature, can be used for systematically computing LLCs:

Step 1: Assign all PNs with demand to an initial LLC of 1. Set variable ITERATION=1.

Step 2: For all PNs in the BOM with LLC=ITERATION and that are components of another PN with LLC=ITERATION increase their LLC by one. Then, increment ITERATION by one.

Step 3: If no PN with LLC=ITERATION that is a component of another PN with LLC=ITERATION then stop. Otherwise return to step 2.

This algorithm takes as input a table containing all individual BOM dependencies between each given PN and its components. The basic idea of the algorithm is to begin by assigning all PNs to the same (highest) level. Using the BOM, PNs in the lowest level (i.e., with the highest LLC) are tested to determine whether they need to be promoted to the next level due to dependency within their current level. Finally, through iterations, PNs which are components of other PNs are moved to the next level of the BOM (a process referred to as bumping).

FIG. 2 is an example that illustrates the application of the algorithm described above. The individual PN-component BOM relationships are shown at level 210. This list of records for part numbers (indicating which components are required for assembly) is used to assign LLCs to each PN. Thus, initially in level 220, according to step 1 of the above algorithm, all PNs are assigned a LLC of "1" and ITERATION is set to "1". At step 2 of the algorithm, a determination is made among PNs with LLC "1" which ones are components to other PNs with LLC "1". The result in this case is that B, C and D are determined (from the list in level 210) to be components and, therefore, should have their LLCs increased by "1". Increasing ITERATION by "1" to "2" and using connecting lines to identify BOM dependency yields the results of level 230. Next, in step 3 of the algorithm described above, it is determined that some PNs have LLC=ITERATION and therefore the algorithm returns to step 2. The algorithm proceeds to assign codes as is shown in level 240 until no further changes are necessary in level 250, i.e., no PN has LLC=ITERATION where ITERATION=5.

The above prior art algorithm for LLCs does not account for special requirements imposed by processes common in semiconductor manufacturing such as binning and material substitution. As mentioned above, binning occurs when a certain manufacturing stage generates a range of qualities. These different quality products correspond to different PNs, however, it is desirable for these PNs to have the same LLC so that they are considered together during the RA phase of production scheduling. Similarly, it is desirable for PNs, that can substitute for one another, to have the same LLC. To account for these special properties of the BOM, modifications are necessary. These modifications are described in U.S. Pat. No. 5,943,484, having a common assignee and incorporated herein by reference in its entirety. The basic modifications involve classifying PNs as siblings that either (a) result from the same binning process or (b) can be substituted for or by that part number. Thus, in the above prior art algorithm if a given PNs LLC is increased in step 2 then so are the LLCs of its siblings.

It is noted that the above algorithm is suitable only for MRP based algorithms that are applied to traditional manufacturing systems. However, the specialized processes in semiconductor manufacturing (e.g. binning, material substitution), and algorithmic requirements for using RA to compute capacitated production schedules that are consistent with accepted business rules, make such an algorithm inadequate for complex manufacturing processes such as those encountered in semiconductor manufacturing.

FIG. 3 further shows the problem with allocating capacity by traditional LLC generation. Assuming the following:

(i) PN A is made from PN B (ii) PN B is made from PN C (iii) PN C is made from PN D (iv) PN X is made from PN Y (v) PN Y is made from PN Z.

In this case, known LLC generators would compute LLC codes for components A, B, C, and D as 1, 2, 3, and 4, respectively, and components X, Y, and Z as 1, 2, and 3, respectively. Consequently, a heuristic such as MRP would first process components A and X (LLC=1), then components B and Y (LLC=2), then components C and Z (LLC=3), and finally component D (LLC=4). This is adequate until capacity is considered. consider the situation in which B and X share the same resource. In the RA implosion stage, the finite capacity of this resource is allocated by starting at the lowest LLC (LLC=4) and moving upwards. Thus, in this case B would receive priority in allocation of capacity over X since it would be processed first. Although, based on established business priorities, it may be desirable to instead give X priority over B thus illustrating the possible failure of traditional LLC generators.

As seen, allocating limited manufacturing resources to achieve a feasible production schedule that is consistent with customer demand is a difficult and common problem faced in many industries. For large-scale multi-stage manufacturing systems the problem is further complicated by the fact that many different parts produced within the manufacturing system share finite capacity resources. Traditional material requirements planning systems assign a numeric code, LLC, to represent the dependence of parts upstream in the bill of material supply chain with those downstream. However and as discussed above, these methods do not capture the need for resource sharing that is created when parts at different levels require the same resources.

SUMMARY OF THE INVENTION

According to an aspect of the invention, a method is provided for computing modified low level codes (LLC) for part numbers throughout a bill of material (BOM) supply chain. The method includes identifying part numbers that share a same capacity resource but cannot be made to have a same LLC due to a BOM material restriction. The part numbers which cannot be made to have the same LLC due to the BOM material restriction are oscillating part numbers (OPN). The highest LLC within the part numbers that share the same capacity resource except for the OPN is identified, and the LLC for the part numbers that share the same capacity resource, excluding the OPN, to the highest LLC are adjusted such that the part numbers which share the same capacity resource have a same LLC. The method then recalculates the LLC for part numbers which violate BOM dependencies by going through the entire BOM supply chain. The recalculated LLC is higher than or equal to the highest LLC provided in the adjusting step for each capacity resource. The adjusting of the LLC to the same LLC permits part numbers at different levels of the BOM which share the same capacity resource to be treated at a same level of the BOM in order to sequence the part numbers for resource allocation.

In accordance with another aspect of the present invention, the method of the present invention comprises identifying part numbers that share a same capacity resource but cannot be made to have a same LLC due to BOM material restriction, where the part numbers which cannot be made to have a same LLC due to the BOM material restriction are oscillating part numbers. Constraints associated with BOM dependency and resource dependency excluding ones associated with oscillating part numbers are identified, and a linear programming formulation is provided which includes the BOM dependency and resource dependency constraints and an objective function defined as sum of the LLC's for all of the PNs. The linear programming formulation excludes the BOM dependency and resource dependency constraints associated with the oscillating part numbers. The linear programming is then solved by determining a minimum total value of the objective function subject to the BOM dependency and resource dependency constraints to thereby determine modified low level codes.

The present invention is also directed to a system of computing modified low level codes (LLC) for part numbers throughout a bill of material (BOM) supply chain. The system includes a mechanism for identifying part numbers that share a same capacity resource but cannot be made to have a same LLC due to a BOM material restriction and a mechanism for identifying a highest LLC within the part numbers that share the same capacity resource. The system further includes a mechanism for adjusting the LLC for all the part numbers that share the same resource to the highest LLC such that the part numbers, except the OPNs, which share the same capacity resource have a same LLC as well as a mechanism for recalculating the LLC for part numbers which violate BOM dependencies. The system can be implemented via a machine readable code or be hard wired into a circuit or other computational component. The changing of the LLC to the same LLC permits part numbers at different levels of the BOM which share the same capacity resource to be treated at a same level of the BOM in order to sequence the part numbers for resource allocation according to priority ranking based on business rules. The present invention further provides for computer programmable code for implementing the steps of the present invention.

BRIEF DESCRIPTION OF THE DRAWINGS

The foregoing and other objects, aspects and advantages will be better understood from the following detailed description of a preferred embodiment of the invention with reference to the drawings, in which:

FIG. 3 shows multiple end products using conventional LLC calculations;

DETAILED DESCRIPTION OF A PREFERRED EMBODIMENT OF THE INVENTION

Figure 1:
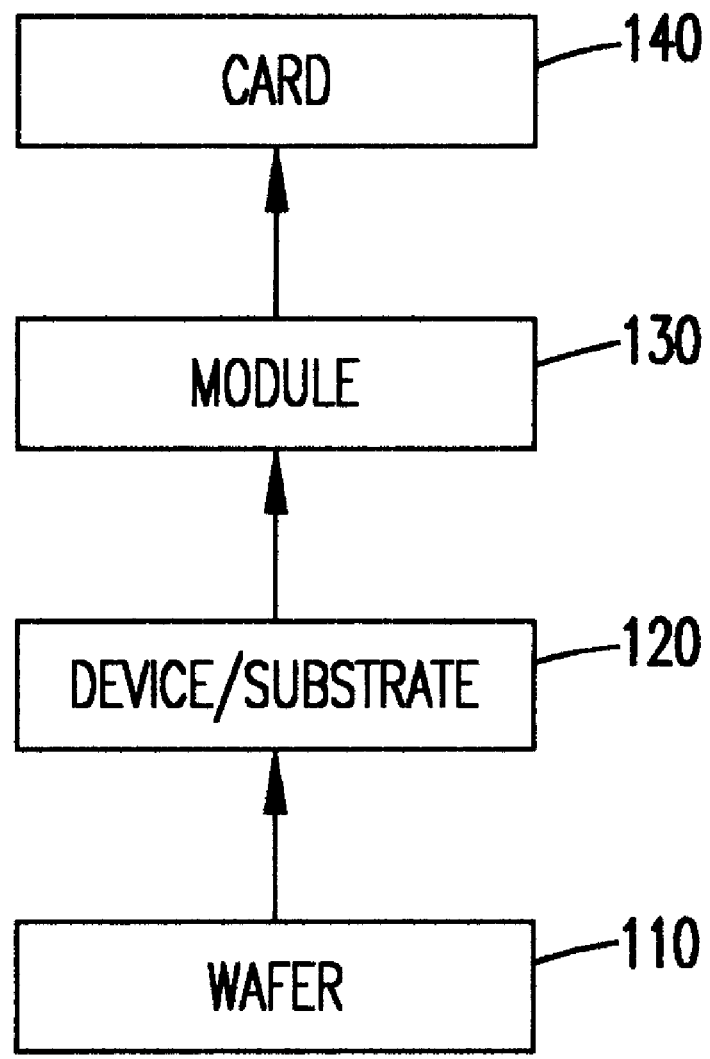
FIG. 1 shows an example of a simplified Bill of Material (BOM) in semiconductor manufacturing.
Figure 2:
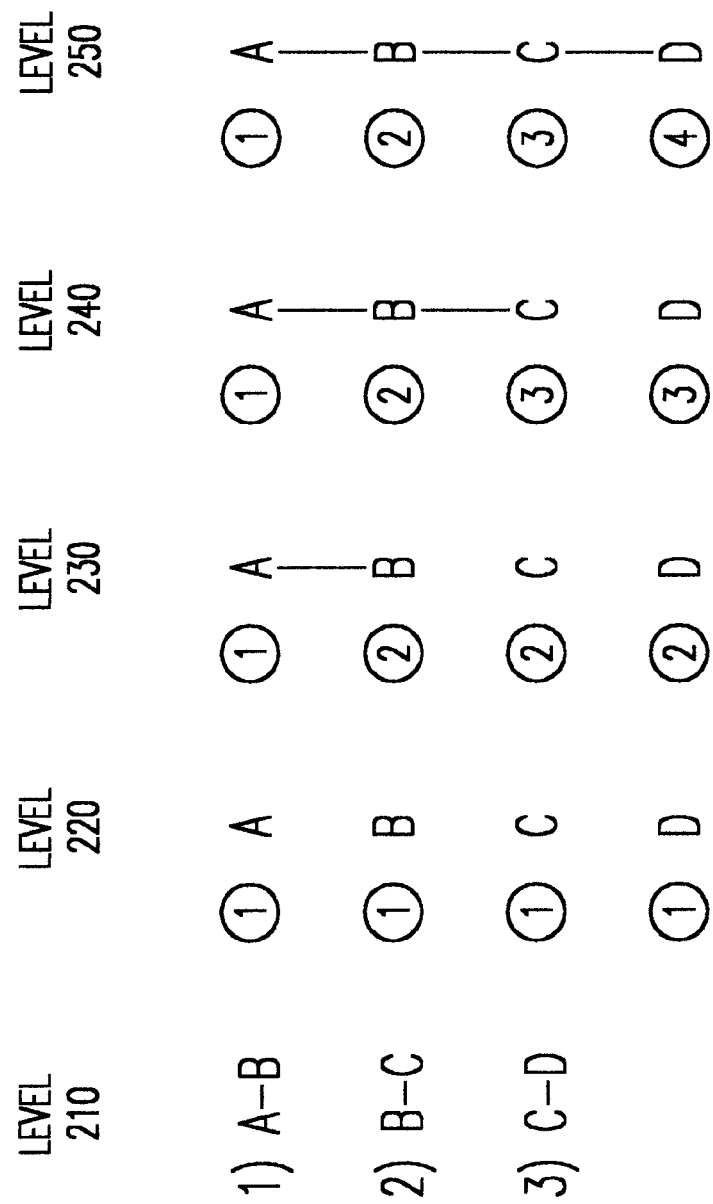
FIG. 2 shows the results of using a conventional low level code (LLC) algorithm.

The present invention is directed to a system and method for computing low level codes (LLC) for part numbers (PN) in order to define an appropriate resource-based ordering for sequentially evaluating PNs in the Bill of Material (BOM) supply chain. The system and method of the present invention accounts for capacity resource sharing among PNs as well as complicated dependencies due to specialized processes like binning and material substitution in, for example, semiconductor manufacturing processes. The present invention is also generalizable to resource rationing problems found in other manufacturing industries.

The present invention modifies the LLCs for controlling sequential capacity allocation through modification of conventional low level codes. The present invention employs a systematic set of decision rules for interactively adjusting LLCs so that the LLCs are consistent with interdependencies of resources among PNs due to resource sharing. Thus, the modified LLCs implemented by the present invention are suitable not only for sequencing the evaluation of PNs in Material Requirements Planning (MRP) but also for appropriately sequencing of PNs for Resource Allocation (RA). The latter sequencing permits PNs at different levels of the BOM, which share resources, to be treated as if they are at the same level of the BOM. Therefore, such resources are able to share capacity according to appropriately defined business rules for priority ranking of material requirements for different PNs. This promotes the rationing of resources among material releases between specified levels of the BOM for the generation of a feasible production schedule in such a way that the resources are allocated according to a priority ranking.

As a brief overview, the present invention employs an iterative process. The first step of this process is to take, as input, the LLCs computed for PNs according to any known conventional methodology. The next step begins by preprocessing the PNs to determine the interdependence resulting from resource sharing. This step may be performed by creating a finite set of resource groups in which each PN requires a resource that is required by at least one other PN in the group. Thus, no group contains PNs in common with another group. These group dependencies among PNs are computed using a recursive algorithm based on a user input data table for the capacity resource requirements for each PN in the BOM. The dependencies are stored as a data table for use in the later stages of the present invention.

Once the PNs are grouped, a subset of PNs, referred to as oscillating part numbers (OPN), are identified for which LLCs consistent with resource sharing are not possible. The OPNs are systematically identified within the resource groups and removed from consideration for modification of their LLCs due to this inconsistency. The removal of the OPNs corresponds to assigning each one to its own unique resource group. The present invention then performs a series of iterations. At each iteration, PNs within each of the resource groups are bumped to the highest level within the group. Having made the PNs consistent with resource dependency, PNs may then be bumped based on their BOM dependency. These iterations proceed until either (i) no further modifications to LLCs are necessary or (ii) a user specified maximum number of iterations has been performed.

The steps of the present invention can thus be summarized as follows:

Step 1: Evaluate LLC based on conventional algorithms

Step 2: Search for, Identify, and Remove OPNs

Step 3: Iteratively apply a two pass algorithm comprising (a) bumping (or adjustment) PNs until LLCs are consistent with resource dependency and (b) systematically adjusting BOM requirements that were violated in step (a), or some maximum number of allowable iterations has been reached.

The results of this processing are then stored in a data table and used throughout the remainder of the production scheduling process to determine the sequence in which PNs are considered for MRP and RA heuristics.

Figure 4:
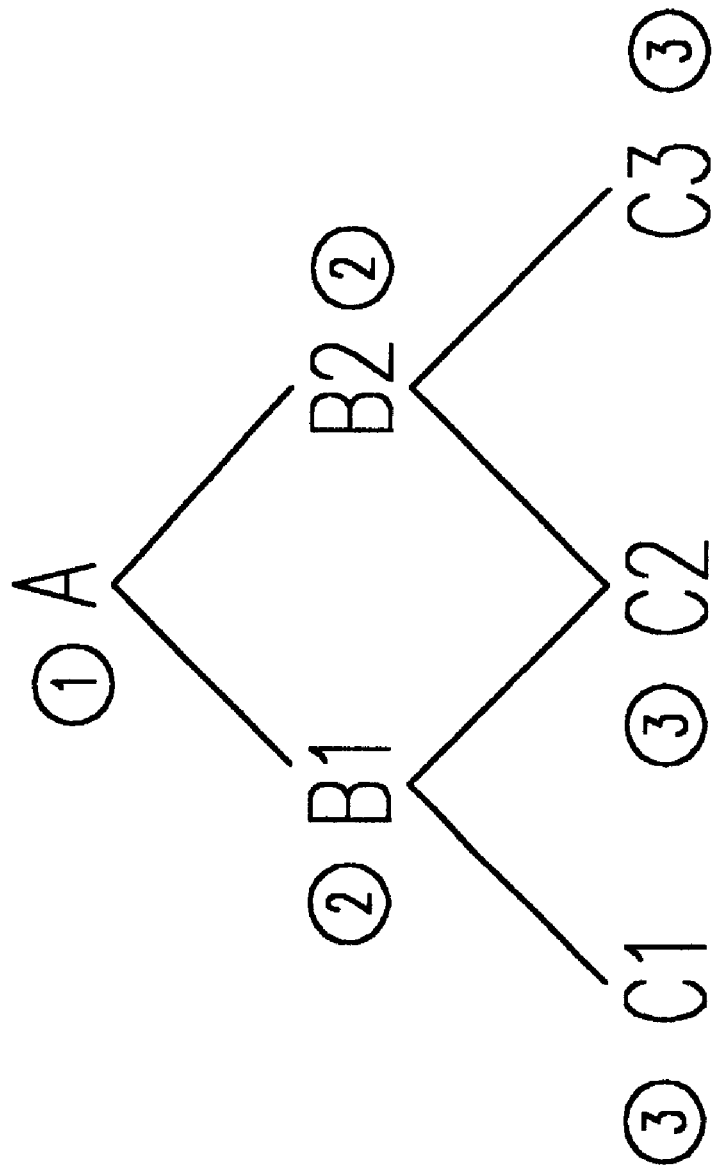
FIG. 4 shows an example of LLC assignment in a simple 3-level BOM.

Now referring to the drawings, FIG. 4 shows an example of LLC assignment in a simple 3-level BOM. In this example, PN A is made from components B1 and B2 which, in turn, are made from sub-components C1, C2, and C3. To begin, PN A would be assigned an LLC of "1" since it is not a part to any other part and all remaining PNs would be incremented to a LLC of "2". Next components B1 and B2 are assigned a LLC of "2" since they are not components of any other parts with LLC "2". Likewise, components C1, C2 and C3 are incremented to a LLC of "3". Therefore, since MRP processes parts in low level code sequence, the LLC would first process part A (LLC=1), then parts B1 and B2 (LLC=2), and finally parts C1, C2 and C3 (LLC=3). This is appropriate since MRP needs to first compute the requirement and production releases of component A before it can know the requirements for components B1, B2 which depends on the component A's requirement, inventory, WIP, yield, and the like.

Figure 5:
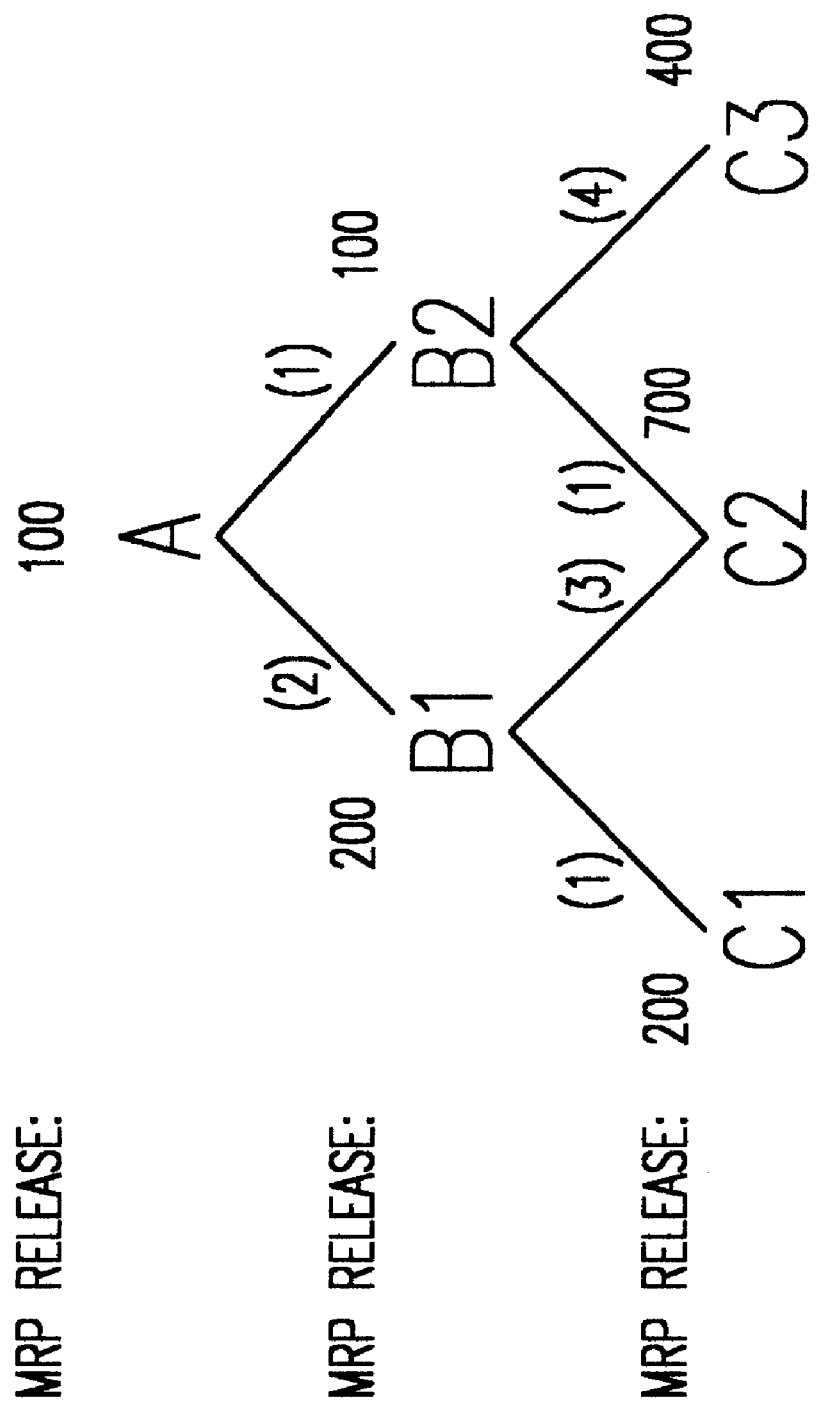
FIG. 5 shows an example of Materials Requirements Panning (MRP) release computation for a 3-level BOM.

FIG. 5 shows an actual effect of requirement for some finished product A on the next level of MRP releases for parts of A. In FIG. 5, product A is assembled from components B1 and B2 in the ratios 1:2 and 1:1, respectively. Thus, requirements for A induces requirements for a material release of 200 units of B1 and 100 units of B2. These MRP releases, in turn, induce requirements for MRP releases of parts for B1 and B2 (i.e., C1, C2 and C3). This simple example illustrates the determination of material release quantities based on requirements for finished products.

Another important feature of MRP is the determination of release dates. This is performed by using manufacturing times for each level of the BOM to work backwards from the finished product delivery date. For example, in FIG. 5, if one week is required to assemble A and two weeks is required to assemble each of B1 and B2, then releases for C1, C2 and C3 must be scheduled three weeks in advance of the delivery date for product A.

The material release sizes and timing obtained from MRP in the example shown in FIG. 5 comprise the uncapacitated production schedule. The next step is to compute a capacitated production schedule. This is performed by proceeding in the opposite direction to MRP and at each level allocating capacity to material releases at each discrete time period. Since capacity is limited, situations are inevitably encountered in which releases planned using MRP are infeasible. In these situations, capacity is allocated among releases according to a priority ranking of the releases. Thus, higher ranked releases are allocated capacity before lower ranked releases. When insufficient capacity is available for a release, the release (or some portion thereof) must be moved either to an earlier or later time period with available capacity.

Figure 3:
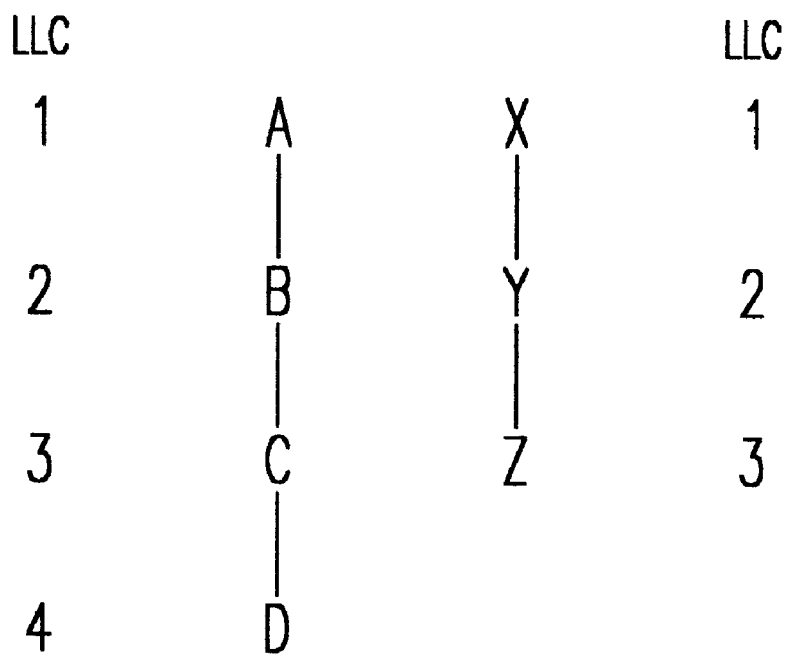
Figure 6:
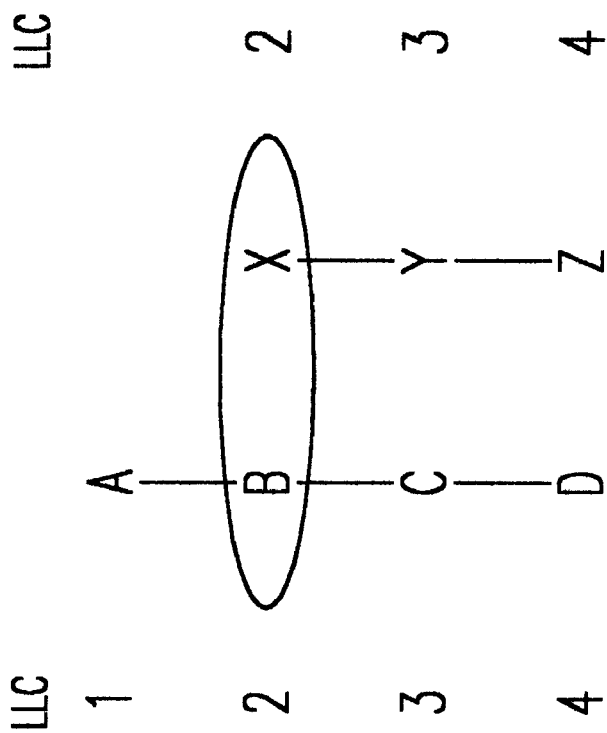
FIG. 6 shows an example in which B and X utilize a same resource provided by implementing the method and system of the present invention.

FIG. 6 shows an example in which B and X utilize a same resource denoted by the oval enclosing B and X. This Figure shows the correct manner for assigning LLCs as implemented by the present invention. In this example, B and X are assigned the same LLC in such a way that the BOM dependencies are not violated. Recall from FIG. 3 that the BOM dependencies require that LLC for A be less than B which is less than C which, in turn, is less than D. Furthermore, BOM dependencies require LLC for X be less than Y which is, in turn, less than Z. Thus, by bumping or incrementing the LLC by one for each of X, Y and Z, the LLC for B and X are the same and all the BOM dependencies are satisfied. As a result, the production planning heuristic would consider both B and X (which share capacity) while processing parts with low level code of "2" would be able to sequence the allocation of capacity according to priority based business rules.

Now understanding the above, it is noted that an aspect of generating modified LLCs according to the present invention involves the concept of resource groups. The resource groups are used to define dependencies between PNs due to the fact that they share resources. These dependencies are above and beyond those implied by the BOM supply chain. The groupings are defined as follows.

1. Each PN within a group requires a capacity resource required by at least one other PN in the group.
2. The resource group categorization is independent of any BOM dependency between PNs. So, PNs in the same group may be at different levels from the point of view of LLC generated through conventional methods. In FIG. 6, for example, PNs B and X would have been in the same resource group.

Figure 7:
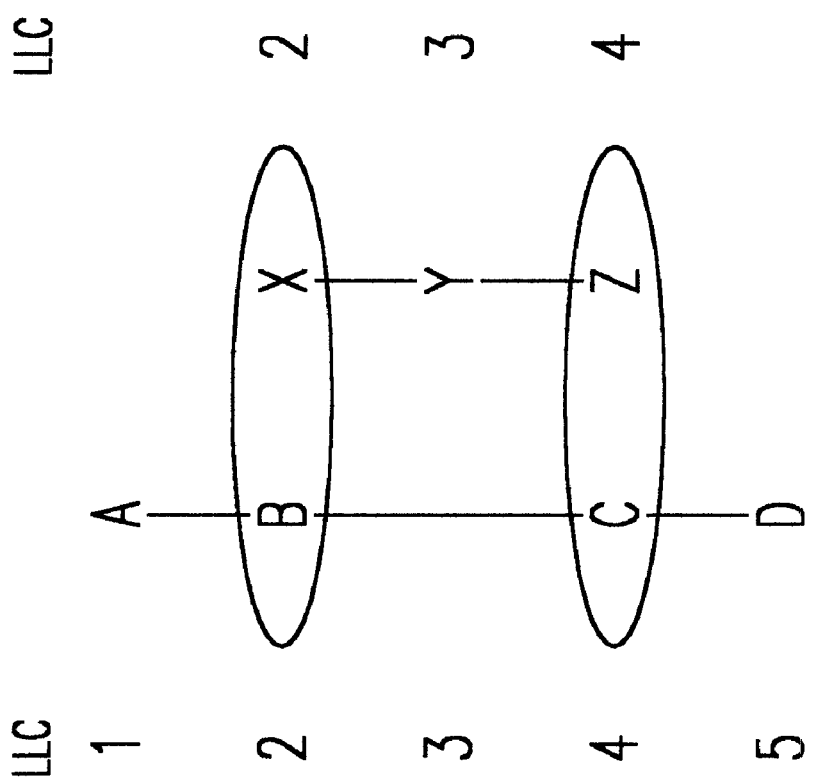
FIG. 7 shows an example in which B and X share the same resource and C and Z share the same resources provided by implementing the method and system of the present invention.

FIG. 7 shows the situation in which there are multiple groups of PNs (as shown by enclosing the respective PNs in ovals). In this example, parts B and X form one group of PNs and parts C and Z form a second group, both groups of which share respective capacity resources. In order to have a consistent set of LLCs, it is necessary to increment X to level "2" so B and X have the same LLC. However, Y remains at level "3" and C is incremented or bumped to level "4". In this manner, C and Z have the same LLC. Thus, the adjustments of LLCs by the use of the present invention is a sequential process resulting in LLCs that correspond to PNs which are in the same group having the same LLC.

Figure 8:
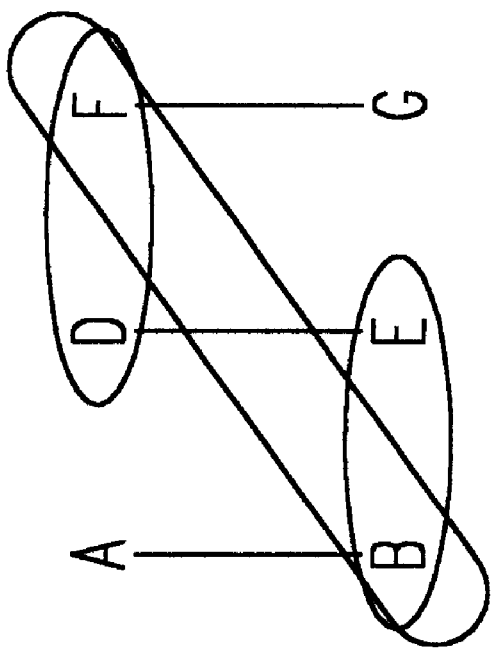
FIG. 8 shows an example illustrating oscillating part numbers (PNs) provided by implementing the method and system of the present invention.

Ideally, all PNs that share capacity resources would be assigned the same LLCs. However, in reality there may be situations in which this is impossible. This type of situation is shown in FIG. 8 where resources are shared by D and F, B and F, and parts B and E. In this case it is not possible for the PNs in the same resource groups to have the same Modified LLCs. This is because B, D, E, and F would have to be assigned the same Modified LLCs due to the resource sharing relationship. However, this cannot be accommodated because of the BOM dependency requiring D and E to have different Modified LLCs. Mathematically the requirements on the LLCs could be expressed as the following system of equations $$LLC\_A < LLC\_B \text{ (BOM dependency)} \quad 1.$$

$$LLC\_D < LLC\_E \text{ (BOM dependency)} \quad 2.$$

$$LLC\_F < LLC\_G \text{ (BOM dependency)} \quad 3.$$

$$LLC\_D = LLC\_F \text{ (Resource Group dependency)} \quad 4.$$

$$LLC\_B = LLC\_E \text{ (Resource Group dependency)} \quad 5.$$

$$LLC\_B = LLC\_F \text{ (Resource Group dependency)} \quad 6.$$

where, for example LLC_A is a variable representing the LLC for PN A.

From a mathematical point of view it is not possible to find a set of LLCs that satisfy equations (1) to (6). Therefore, from an algorithmic point of view, it is necessary to search for and identify resource group dependencies that should be netted out of the LLC modification process due to their inconsistency. Oscillating PNs are PNs that cannot be guaranteed to have the same LLC with all other PNs with which it shares a common capacity resource because of inconsistent resource group dependencies. However, the OPNs nonetheless have to be assigned an LLC consistent with BOM dependencies.

Figure 9:
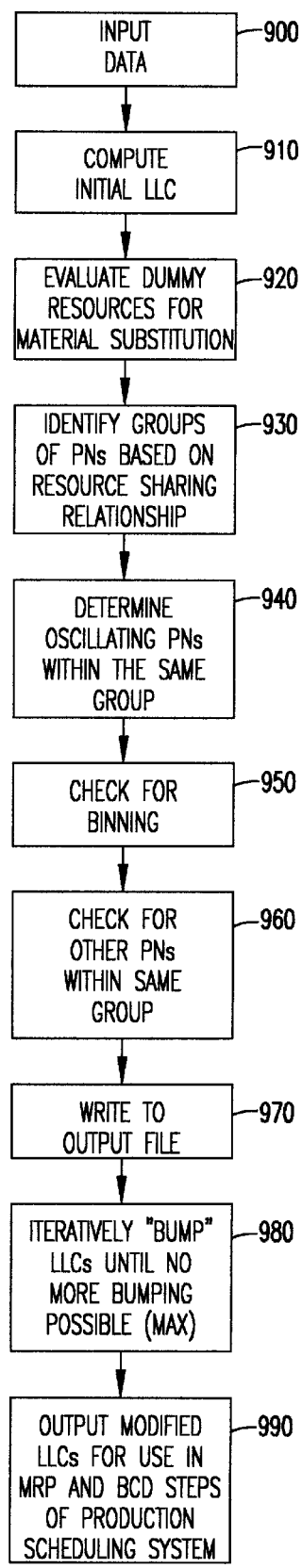
FIG. 9 shows a flow chart implementing the steps of the present invention.

Having now given several detailed examples illustrating the underlying concepts and the general impact on the overall production scheduling system using the present invention, the implementation of the method and system of the present invention is now provided. FIG. 9 represents a flow diagram showing the steps implemented by the present invention, but may equally represent a high level system diagram showing the system of the present invention (much like that of FIGS. 10, 11 and 13). The steps of FIG. 9 (as well as FIGS. 10, 11 and 13) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

At step 900, the present invention takes several sources of input data which may include, for example, BOM Table
Capacity Required Table
PN Substitution Table
Binning Table.
Material Substitution Table Output from the modified LLC includes Oscillating PN Table and Modified LLC Table for both oscillating and non-oscillating PNs.

Steps 910 to 940 generally identify PNs that share the same capacity resource but cannot be made to have the same LLC because of the BOM material restriction. Resources or capacity resources are typically machines or workcenters for carrying out processes in, for example, semiconductor manufacturing and may include items such as furnaces, cutting tools for dicing chips, and testing machines for determining the operational characteristics of devices. Now, at step 910, the present invention computes the initial LLCs for each PN using a known method such as described in U.S. Pat. No. 5,943,484 assigned to International Business Machines, Corp., and incorporated herein in its entirety by reference. At step 920, the method of the present invention determines the capacity resources required to manufacture each PN. If, for example, part X can substitute for part Y, then the present invention will add a dummy resource, for example, sub_X_Y, and model as if parts X and Y each consume capacity resource sub_X_Y.

Figure 10:
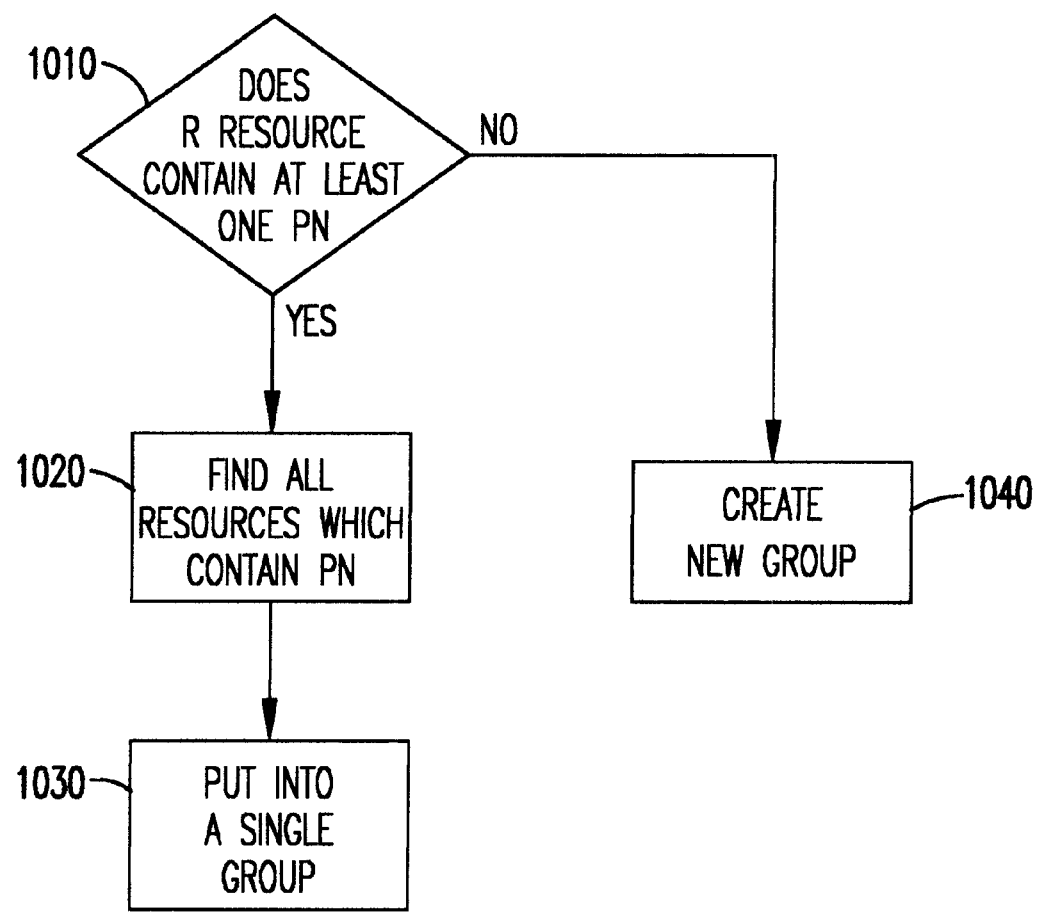
FIG. 10 shows a flow chart implementing substeps of step 930 of FIG. 9.

At step 930, a map is generated containing for each resource the parts consuming that resource and the part's initial LLC. In this step, an identification of groups of resources is made so that the resource of each group shares PNs with other resources of that group and where each PN is in a single group. The net result of this step is that all PNs which share capacity belong to the same group. The identification of the groups for each resource described at step 930 may be performed in accordance with the following steps (as shown in FIG. 10).

Step 1010: Does resource R contain at least one PN which consumes the capacity of another resource?.

Step 1020: If yes, find all resources which contain at least one PN which also consumes capacity of resource R.

Step 1030: Put each of these resources and all other resources which are a member of the resource's group, if any, into a single group and remove these resources from any other group.

Step 1040: If no, then create a new group for resource R.

At the end of step 930, there are groups of resources which imply a grouping of PNs which would have the same LLC because they are in the same resource group.

Returning again to FIG. 9, at step 940, for each PN of each group a recursive BOM structure for identifying PNs such that giving them the same LLC will be impossible based on BOM dependencies is performed. This step is performed by searching for and identifying infeasible LLC requirements (such as in the example in FIG. 8) due to BOM dependencies between PNs in different resource groups. These PNs are called oscillating PNs (OPN). When these OPNs are identified, the present invention also checks if any of the OPNs are binned, or if they can be substituted with or for another PN at step 950. If so, at step 960, the present invention checks for other PNs in this binning point that are within the same group. These are also identified as OPNs and are written to an output file at step 970.

At steps 980 and 990, the LLCs associated with the PNs are changed in such a way that PNs that share the same resource and PNs that substitute for each other will have the same LLC. This step assumes that the initial LLCs and OPNs have already been created at steps 910 through 970. At step 980, the present invention begins to execute the a same procedure as shown and described at steps 910 and 920. This results in each resource having the parts consuming that resource and the part's initial LLC. Now an iterative process is performed. In embodiments, the maximum number of iterations is specified in order to limit/fix the maximum possible running time of the steps implemented in the present invention in the event that there are undetected OPNs. In practice, the steps of the present invention almost always converges before the maximum number of iterations is reached.

Figure 11:
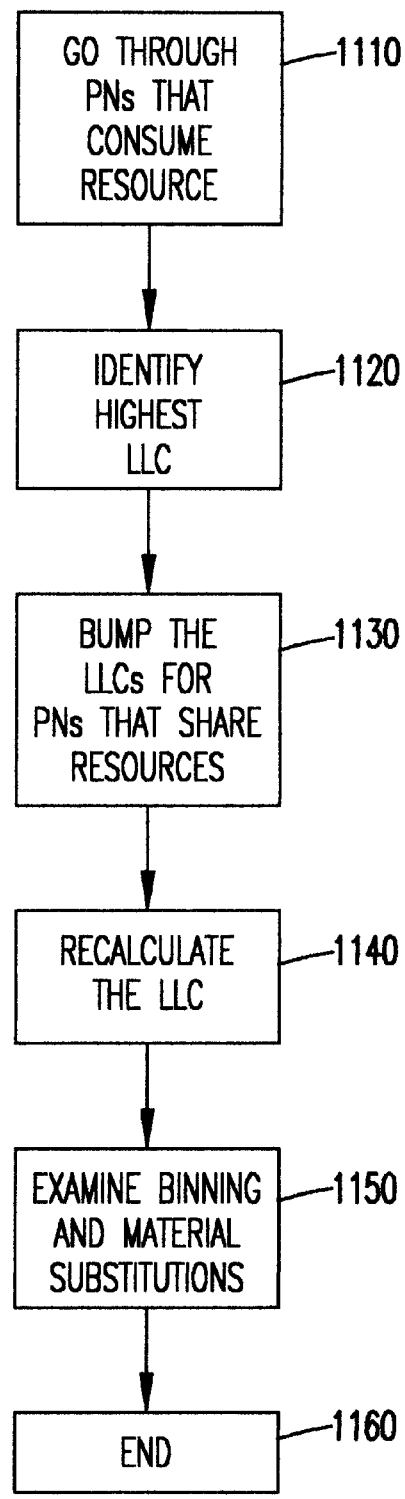
FIG. 11 shows a flow chart implementing substeps of step 980 of FIG. 9.

In each iteration performed at step 980, the following steps may be performed (as shown in FIG. 11):

Step 1110: For each resource, go through the PNs that consume the resource.

Step 1120: Identify the highest LLC within these PNs

Step 1130: Bump (increment) or adjust the LLCs for all the PNs that share this resource to the highest LLC except OPNs.

Step 1140: Recalculate the LLCs to be consistent with BOM dependencies of parts and sub parts by going through the entire BOM supply chain due to a violation or restriction. The recalculated LLC should be higher than or equal to the highest LLC adjusted in step 1130 for each capacity resource.

Step 1150: Examine binning and material substitutions also to determine and execute necessary recalculations of LLCs due to these relationships.

Step 1160: End iterations. If at any point bumping is determined to be unnecessary for all resources then all the LLCs have been adjusted in such a way that PNs that share the same resource have a same LLC and iterations are halted because of convergence.

The net result of steps 1110 though 1130 is to satisfy the desire for PNs in the same resource group having the same LLC. It is also noted that in step 1140 priority is given to BOM dependencies and binning and material substitution relationships to restore LLC requirements that may have been violated in steps 1110 though 1130. Finally, step 1160 is a check to determine if the algorithm has converged. Step 980 may alternatively be implemented via linear programming providing the same results as described above.

Returning to FIG. 9, at step 990, the computed modified LLCs are written and/or saved to an output file for use in the remaining production scheduling system.

The present invention has been implemented on a IBM SP2 machine with AFS for data storage. The SP2 is a collection of IBM RISC 6000 systems running under a common AIX operating system. The steps implementing the present invention are preferably programmed in C/C++. It should be understood by those of ordinary skill in the art, however, that the present invention is not limited to the above implementation and is independent of the computer/system architecture. Accordingly, the present invention may equally be implemented on other computing platforms, programming languages and operating systems, and may also be hardwired into a circuit or other computational component.

An alternative embodiment to the present invention relates to the use of linear programming techniques. By way of example, subsequent to determining a set of OPNs to be removed due to inconsistencies in BOM and resource dependencies a linear programming (LP) based approach can be used to generate LLCs. In such a formulation of the problem the LLC for each PN would be associated with a decision variable in the linear program. For example, a PN A would be represented by decision variable LLC_A As is known by those of ordinary skill in the art, an LP formulation is defined by an objective function and a set of constraints. The objective function is a linear function of the linear programs decision variables which measures the quality of different feasible alternative values for the decision variables. The constraints are linear equations that must be satisfied by the decision variables and thus define feasible values of the decision variables (i.e., LLCs).

Each constraint falls into one of two groups (i) BOM dependency constraints and (ii) Resource dependency constraints. The basic form of the two types of constraints is illustrated for some specific examples in FIG. 12. In 1210, of FIG. 12, the BOM dependency constraints are illustrated. These constraints require a component of a given PN having a higher LLC than the PN, itself. In 1220, a binning and substitution example is illustrated in which PN A and PN B bin from PN C and, furthermore, PN B may substitute for PN A. Either the binning or substitution relationship indicates a need for constraints in 1220. Thus, it is required that both PNs B and C have higher LLC than A, but, at the same time, PNs B and C should have the same LLC. In 1230, the resource dependency constraints are illustrated. In this case it is desirable to have PN A and PN B to have the same LLC, and PN B and PN C to have the same LLC, as represented by the equality constraints in 1230. For an actual large-scale production planning and scheduling problem these various types of constraints together mathematically define the complex requirements that determine feasible values of the LLCs.

Figure 12:
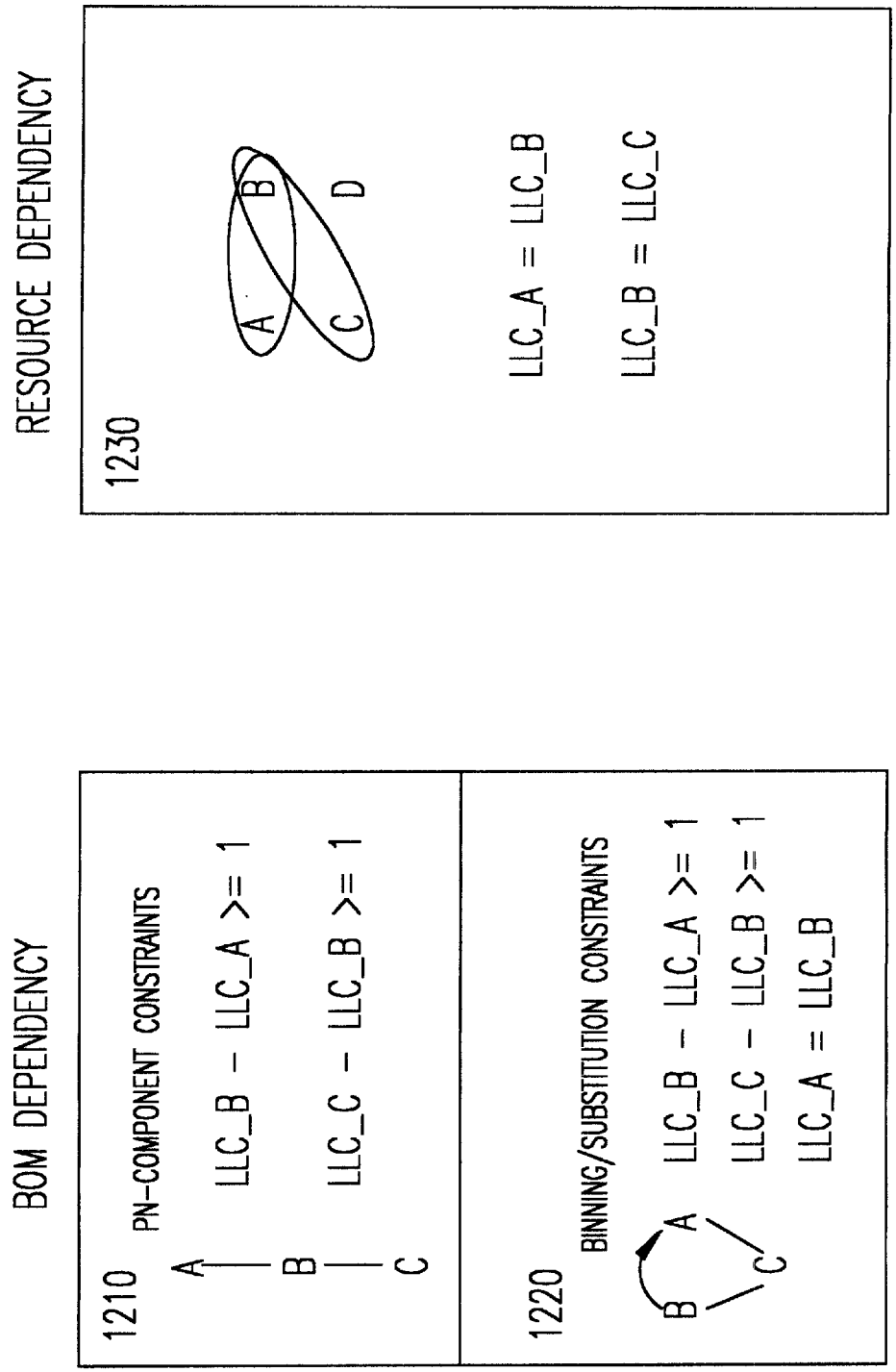
FIG. 12 is an example of linear programming constraints for BOM and resource dependencies.

The actual formulation of the LP uses the types of linear constraints illustrated in the examples of FIG. 12 (albeit on a much larger scale) together with an appropriately defined objective function. This objective function can be defined as the sum of the LLCs for all PNs. Solving the problem as a minimization problem (i.e. where the goal is to determine the minimum total value of the objective function subject to the given constraints) thus directing the solution to the LP towards a particular feasible solution with minimal values for the LLCs. Thus, the linear program involves determining the minimum value of the LLCs subject to the conditions that (i) all of the BOM dependency and resource dependency constraints are satisfied and (ii) the LLC decision variables are nonnegative. The latter constraints are due to the non-negativity constraints common to LPs and familiar to those of skill in the art. This LP can be solved using existing LP methods such as those used in commercial LP solvers.

Figure 13:
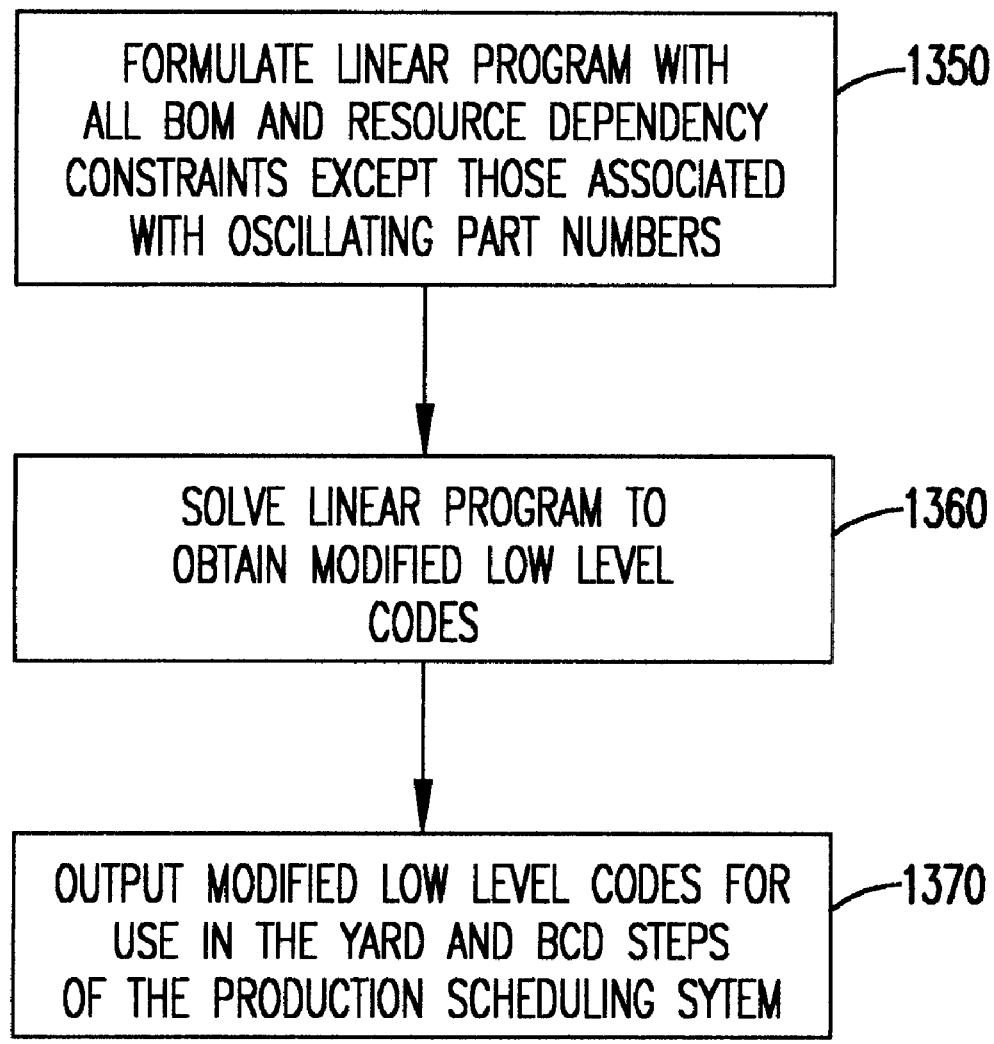
FIG. 13 is a flow chart showing the steps of an alterative embodiment to the present invention.

The structure of the alternative steps for performing the present invention are partially related to the steps shown in FIG. 9. The alternative steps rely on identification of OPNs as illustrated in FIG. 9; however, the difference in the alternative approach based on linear programming appears as a replacement of steps 950 to 990. FIG. 13 shows the new steps of the alternative approach to the present invention. At step 1350, the linear programming model is formulated according to the BOM and resource dependency constraints described in FIG. 13. In this step the resource dependency constraints associated with the oscillating parts are identified and left out of the linear programming formulation since they would lead to an infeasible LP. At step 1360, the resulting linear program is solved, and at 1370 the modified LLCs obtained from solving the linear program are output for use in MRP and BCD steps of the production and scheduling system.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method for computing modified low level codes (LLC) for part numbers throughout a bill of material (BOM) supply chain, comprising the steps of:

identifying part numbers that share a same capacity resource but cannot be made to have a same LLC due to a BOM material restriction, wherein the part numbers which cannot be made to have the same LLC due to the BOM material restriction are oscillating part numbers (OPN);

identifying a highest LLC within the part numbers that share the same capacity resource except for the OPN;

adjusting the LLC for the part numbers that share the same capacity resource, excluding the OPN, to the highest LLC such that the part numbers which share the same capacity resource have a same LLC; and recalculating the LLC for part numbers which violate BOM dependencies by going through the entire BOM supply chain, the recalculated LLC is higher than or equal to the highest LLC provided in the adjusting step for each capacity resource, wherein the adjusting of the LLC to the same LLC permits part numbers at different levels of the BOM which share the same capacity resource to be treated at a same level of the BOM in order to sequence the part numbers for resource allocation.

2. The method of claim 1, wherein the step of identifying part numbers includes the steps of computing an initial LLC for each of the part numbers and determining the capacity resource required to manufacture each part associated with the part numbers.

3. The method of claim 1, further comprising the step of changing the LLC associated with another part number, which can be substituted for the identified part numbers, to the same LLC as the identified part numbers.

4. The method of claim 3, further comprising the steps of:

determining capacity resources required to manufacture each of the part numbers; and determining whether parts associated with each of the part numbers can be substituted with each other.

5. The method of claim 4, comprising the further steps of:

ascertaining whether the capacity resources contain at least one part number which consumes the capacity of another capacity resource;

finding all of the capacity resources which contain at least one part number which also consumes another capacity resource, if the ascertaining step is affirmative;

placing all of the found capacity resources into a single group and removing these capacity resources from other groups; and creating a new group for each capacity resource of the capacity resources, if the ascertaining step is negative.

6. The method of claim 5, wherein the step of identifying part numbers that share a same capacity resource includes searching for and identifying infeasible LLC requirements due to BOM and resource dependencies between the part numbers in different resource groups.

7. The method of claim 6, further comprising the steps of:

checking whether a part is binned or can be substituted with and for another part number; and checking for other part numbers in the binning that are within a same group; and providing the same LLC for the part numbers in the binning.

8. The method of claim 1, wherein the steps of identifying a highest LLC, adjusting the LLC and recalculating the highest LLC is an iterative process where a maximum number of iterations is predetermined in order to limit a maximum running time.

9. The method of claim 1, wherein the recalculating step is provided priority to BOM dependencies and binning and material substitution relationships in order to restore LLC requirements that may have been violated.

10. A method for computing modified low level codes (LLC) for part numbers (PNs) throughout the bill of material supply chain (BOM), comprising the steps of:

identifying part numbers that share a same capacity resource but cannot be made to have a same LLC due to BOM material restriction, wherein the part numbers which cannot be made to have a same LLC due to the BOM material restriction are oscillating part numbers;

identifying constraints associated with BOM dependency and resource dependency excluding ones associated with oscillating part numbers;

providing a linear programming formulation comprised of the BOM dependency and resource dependency constraints and an objective function defined as sum of the LLC's for all of the PNs, the linear programming formulation excluding the BOM dependency and resource dependency constraints associated with the oscillating part numbers; and solving the linear programming by determining a minimum total value of the objective function subject to the BOM dependency and resource dependency constraints to thereby determine modified low level codes.

11. The method of claim 10, wherein the solving step includes determining a minimum value of the LLCs subject to (i) all of the BOM dependency and resource dependency constraints being satisfied and (ii) LLC decision variables are nonnegative.

12. The method of claim 11, wherein the BOM dependency and resource dependency constraints are linear equations that satisfy the LLC decision variables and define feasible values of the LLC decision variables.

13. The method of claim 10, wherein the BOM dependency and resource dependency constraints require a component of a PN to have a higher LLC than the PN, itself.

14. A system of computing modified low level codes (LLC) for part numbers throughout a bill of material (BOM) supply chain, comprising:

means for identifying part numbers that share a same capacity resource but cannot be made to have a same LLC due to a BOM material restriction, wherein the part numbers which cannot be made to have the same LLC due to the BOM material restriction are oscillating part numbers (OPN);

means for identifying a highest LLC within the part numbers that share the same capacity resource except for the OPN;

means for adjusting the LLC for the part numbers that share the same capacity resource, excluding the OPN, to the highest LLC such that the part numbers which share the same capacity resource have a same LLC; and means for recalculating the LLC for part numbers which violate BOM dependencies by going through the entire BOM supply chain, the recalculated LLC is higher than or equal to the highest LLC adjusted in the adjusting step for each capacity resource, wherein the changing of the LLC to the same LLC permits part numbers at different levels of the BOM which share the same capacity resource to be treated at a same level of the BOM in order to sequence the part numbers for resource allocation.

15. The system of claim 14, further comprising:

means for changing the LLC associated with another part number, which can be substituted for the identified part numbers, to the same LLC as the identified part numbers;

means for determining capacity resources required to manufacture each of the part numbers; and means for determining whether parts associated with each of the part numbers can be substituted with each other.

16. The system of claim 15, further comprising:

means for ascertaining whether the capacity resources contain at least one part number which consumes the capacity of another capacity resource;

means for finding all of the capacity resources which contain at least one part number which also consumes another capacity resource, if the ascertaining step is affirmative;

means for placing all of the found capacity resources into a single group and removing these capacity resources from other groups; and means for creating a new group for each capacity resource of the capacity resources, if the ascertaining step is negative.

17. A machine readable medium containing code for computing modified low level codes (LLC) for part numbers throughout a bill of material (BOM) supply chain, comprising the steps of:

identifying part numbers that share a same capacity resource but cannot be made to have a same LLC due to a BOM material restriction, wherein the part numbers which cannot be made to have the same LLC due to the BOM material restriction are oscillating part numbers (OPN);

identifying a highest LLC within the part numbers that share the same capacity resource except for the OPN;

adjusting the LLC for the part numbers that share the same capacity resource, excluding the OPN, to the highest LLC such that the part numbers which share the same capacity resource have a same LLC; and recalculating the LLC for part numbers which violate BOM dependencies by going through the entire BOM supply chain, the recalculated LLC is higher than or equal to the highest LLC provided in the adjusting step for each capacity resource, wherein the adjusting of the LLC to the same LLC permits part numbers at different levels of the BOM which share the same capacity resource to be treated at a same level of the BOM in order to sequence the part numbers for resource allocation.

* * * * *

UNITED STATES PATENT AND TRADEMARK OFFICE
CERTIFICATE OF CORRECTION

PATENT NO. : 6,584,370 B2
DATED : June 24, 2003
INVENTOR(S) : Brian T. Denton et al.

It is certified that error appears in the above-identified patent and that said Letters Patent is hereby corrected as shown below:

<u>Title page,</u>
Item [75], Inventors, change "Essec" to -- Essex --.

Signed and Sealed this

Seventh Day of October, 2003

JAMES E. ROGAN
*Director of the United States Patent and Trademark Office*